T. W. GREEN.
ROTARY BLOWER.
APPLICATION FILED MAY 26, 1910.
994,311.
Patented June 6, 1911.
3 SHEETS—SHEET 1.
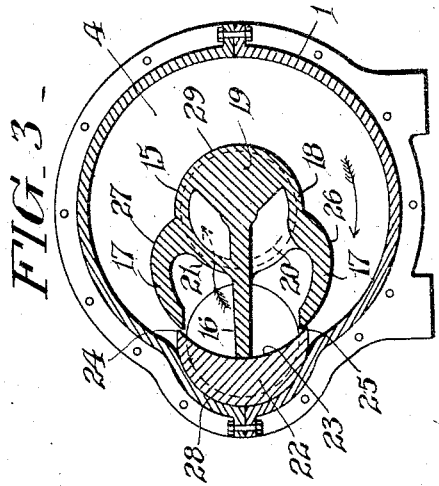
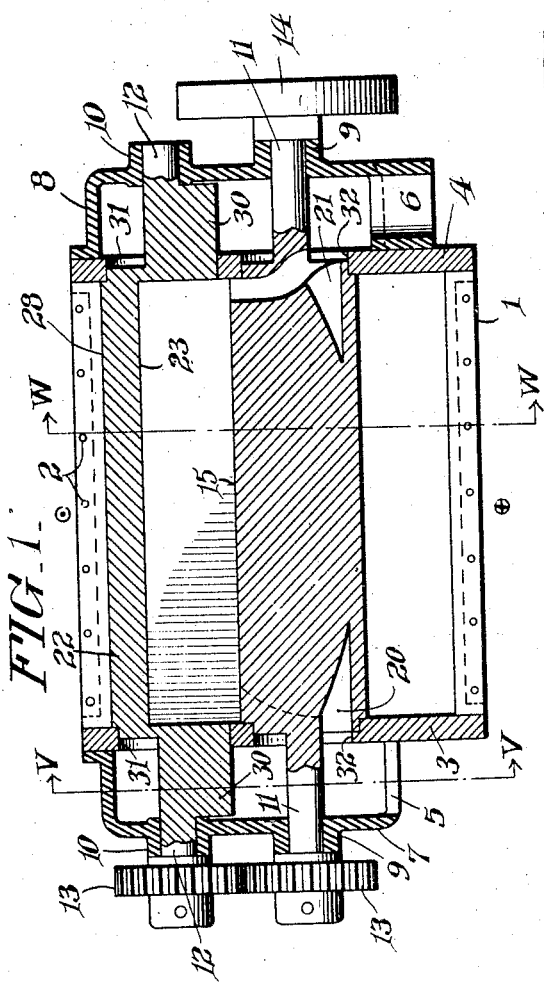
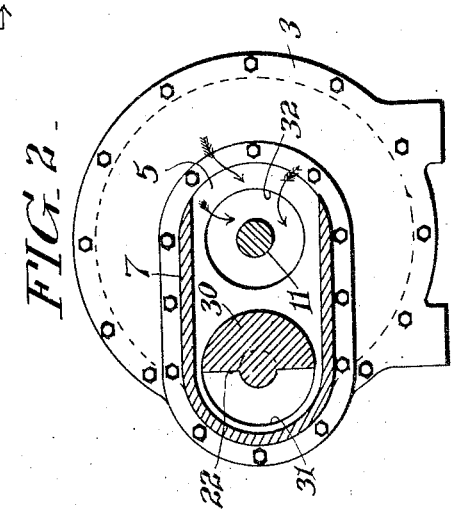
WITNESSES
INVENTOR
BY
ATTORNEY

T. W. GREEN.
ROTARY BLOWER.
APPLICATION FILED MAY 26, 1910.

994,311.

Patented June 6, 1911.
3 SHEETS—SHEET 2.

WITNESSES
Edmund B. Seymour
A. Helen Abplanalp

INVENTOR
Thomas W. Green

BY
Thomas D. Mowlds
ATTORNEY

T. W. GREEN.
ROTARY BLOWER.
APPLICATION FILED MAY 26, 1910.
994,311.
Patented June 6, 1911.
3 SHEETS—SHEET 3.
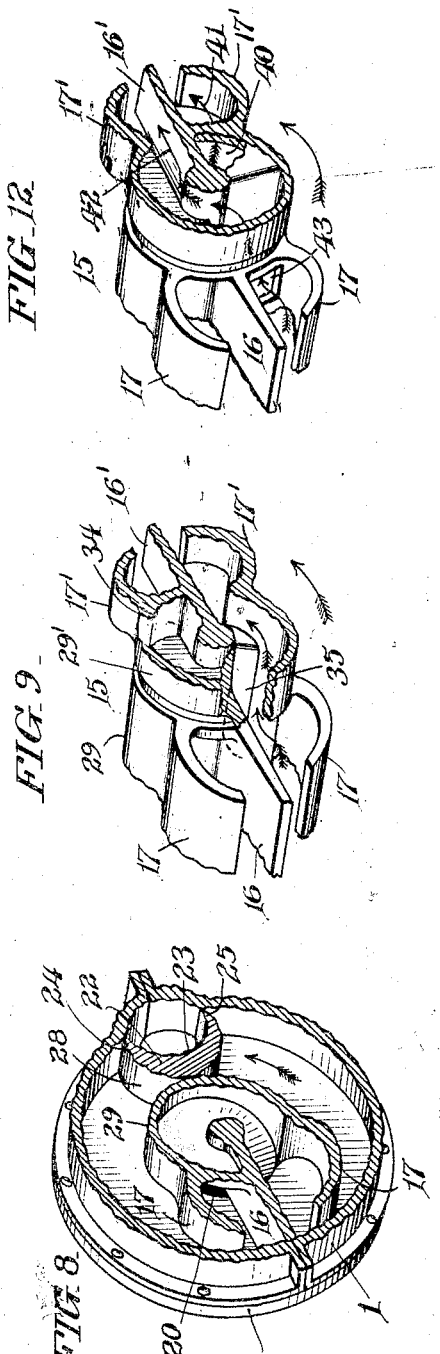
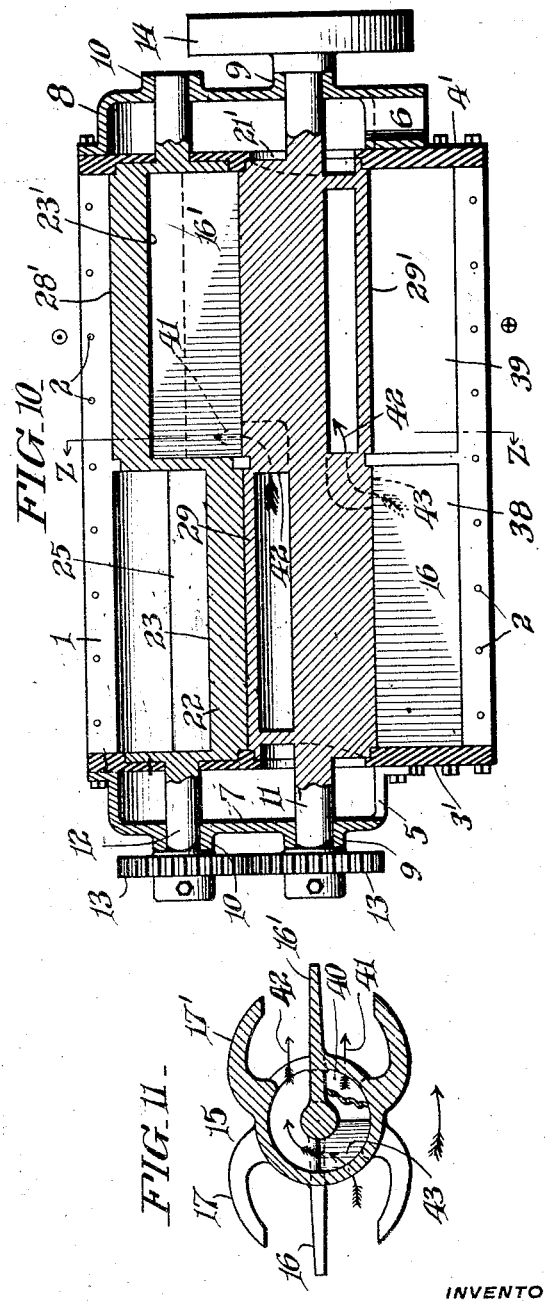
WITNESSES
INVENTOR
BY
ATTORNEY

UNITED STATES PATENT OFFICE.

THOMAS W. GREEN, OF PHILADELPHIA, PENNSYLVANIA.

ROTARY BLOWER.

994,311.

Specification of Letters Patent.

Patented June 6, 1911.

Application filed May 26, 1910. Serial No. 563,594.

*To all whom it may concern:*

Be it known that I, THOMAS W. GREEN, a citizen of the United States, and a resident of Philadelphia, Pennsylvania, have invented a certain new and useful Rotary Blower, of which the following is a specification.

The purpose of my invention is to partially inclose a rotary blower impeller blade by a web, vane or shroud of partial cylindrical contour terminating in or flaring into wings of oppositely curved contour and using therewith a cresent valve, whose interior or concave face seals by closely approaching the flared terminals and whose convex surface rolls upon the cylindrical contour of the web during the mutual and preferably equal rotation of the valve and impeller blade.

A further purpose of my invention is to provide a two cylinder balanced rotary blower having but a single valve mechanism in each cylinder, providing for the passage of oppositely directed impeller blades at 180° angular distance from each other and making use of the blasts from the two blowing cylinders preferably in series or in series-parallel.

A further purpose of my invention is to provide a rotary blower with an impeller blade and side protecting flared webs or vanes all coöperating with a single rotary valve to seal throughout the circumference of impeller travel.

A further purpose of my invention is to provide a rotary blower having tandem cylinders of the same size or of different sizes, varying either in length or diameter, or both, in series arrangement, using valve mechanisms for the two cylinders in axial coincidence, but coöperating each with a single impeller blade and at different times.

Further purposes of my invention will appear in the specification and in the claims appended thereto.

I have preferred to illustrate my invention by a single cylinder having balanced impeller and valve, and by two forms of "tandem" cylinders, balancing by the impellers, all of which have proved practical and of good mechanical proportion and construction, without, however, intending to suggest that these are the only forms in which my invention may appear, and, in fact, with knowledge that the structural embodiment of my invention may be greatly varied.

Figure 7:
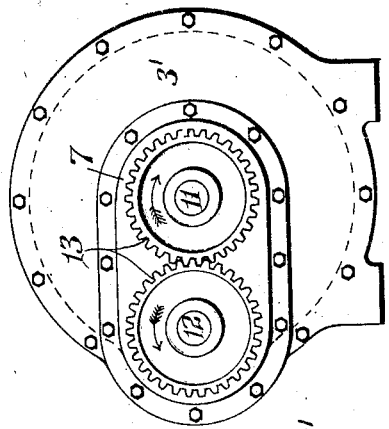
Figure 6:
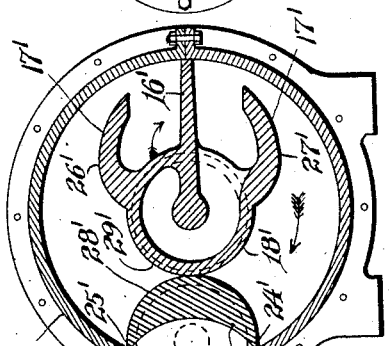
Figure 5:
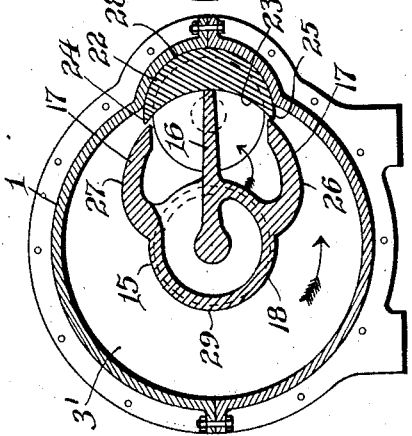
Figure 4:
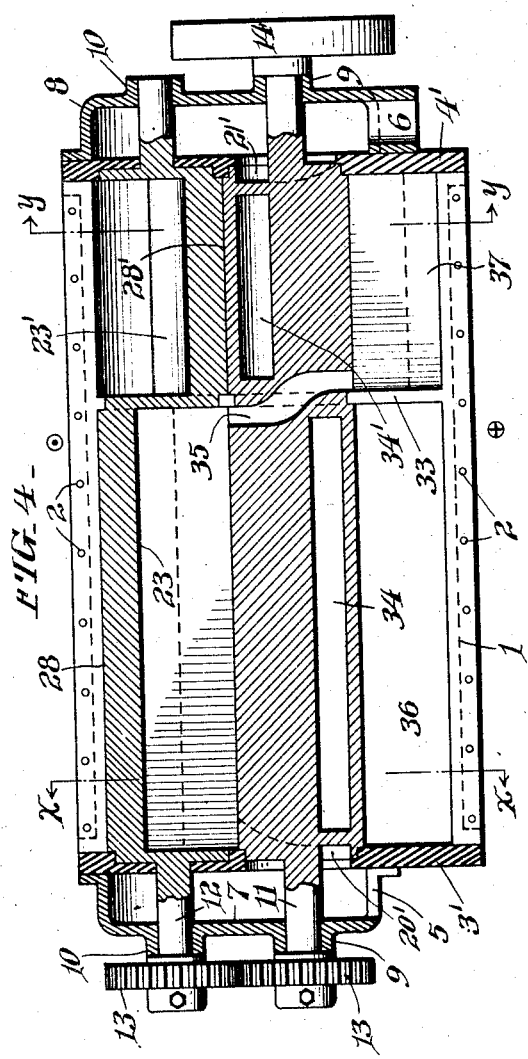

Figure 1 is a horizontal section of a single cylinder and balanced impeller and valve embodying my invention. Fig. 2 is a transverse section of Fig. 1 upon line *v—v* thereof. Fig. 3 is a transverse section of Fig. 1 upon line *w—w* thereof. Fig. 4 is a horizontal section of one form of my invention corresponding to Fig. 1. Fig. 5 is a vertical section of the structure shown in Fig. 4 upon line *x—x* of Fig. 4, looking in the direction of the arrows. Fig. 6 is a vertical section of the structure shown in Fig. 4, taken upon line *y—y* and having its direction indicated by the arrows in that figure. Fig. 7 is an end elevation of the structure shown in Figs. 4, 5 and 6 looking from the left-hand end of Fig. 4. Fig. 8 is a broken perspective view of the structure shown in Fig. 5. Fig. 9 is a broken perspective view of mechanism at adjoining ends of the two cylinders seen in Fig. 4. Fig. 10 is a horizontal section of a third form of my invention. Fig. 11 is a transverse section of the impeller blades taken upon line *z—z* of Fig. 10. Fig. 12 is a broken perspective view of the structure shown in Fig. 11.

The same reference numerals indicate like parts in the drawings.

1 is an outer casing which is divided transversely into two parts which are bolted together through holes 2 and which are provided with end walls 3, 4, which are similar but reversely facing. At opposite ends inlet and exhaust openings 5 and 6 lead into compartments formed by casings 7, 8 within which bearings 9, 9 and 10, 10 support shafts 11, 11 and 12, 12, carrying the impeller and crescent valve respectively. Upon one end of each of these shafts is placed a gear 13, so that the two gears intermesh and cause the shafts to rotate at equal speed as the result of motion imparted to one of them through pulley 14.

The impeller 15 is made up of blade 16, side wings 17, 17 forming a passage between each and the blade, a web 18 joining the wings 17, 17 and a counterweight 19 within the web and of sufficient size to compensate for the blade and wings. The wings depart from the cylindrical form of the web 18 and are conveniently described as "flared". The counterweight results in a more or less complete filling of the space between the shaft and the web throughout the greater part of the length of the impeller, but leaves the ends free for admission port 20 and exhaust port 21, upon opposite sides of the impeller blade, and for distribution channels therefrom to the space upon different sides of the blade, respectively, by which the air is freely admitted at the one end and discharged at the other. With rotation in either direction air will be admitted freely behind the blade and have a continuously open exhaust ahead of the blade.

In order that a trap or seal may be formed at some point in the circle of revolution of the blade 16, and which shall at the same time permit the blade to pass it without appreciable leakage, I provide a crescent valve 22 with whose inner surface 23 the blade affords a seal by approach as close as possible without actual contact. The edges 24, 25 of the crescent follow, for different directions of rotation, the outer surfaces 26, 27 of the wings, and the outer surface 28 of the crescent correspondingly seals with the outer surface 29 of the web, so that there is an effective sealing action between different parts of the crescent and the impeller. As a result, with each rotation there is an inlet of a cylinder full of air at the same time that the cylinder full of air admitted during the preceding rotation, is trapped and expelled. The action is the same, and continuous, whichever the direction of rotation. The crescent valve is balanced by weights 30, 30 and the ends of the valve and impeller are sealed against passage of air other than through the ports by effective approach to or contact with the openings 31 and 32.

As best seen from Fig. 3, the space between the impeller blade and the wing upon one side affords a passage within which the air from the inlet port (not there shown) may enter and from which it is free to enter the cylinder back of the blade as soon as the blade has cleared the crescent valve. It is shut off from free entry into the cylinder from the time the edge of wing 17 comes into operative relation with edge 25 until blade 16 leaves the inner surface of the crescent. Likewise the space between the blade and the other wing affords a passage within which the air which is being compressed ahead of the blade may pass to the outlet aperture. In this case also the passage is shut off from the rest of the cylinder from the time the edge of its wing comes in operative relation with the edge 24 of the valve until the blade 16 ceases to follow the inner surface of the crescent. During these two short periods the inlet and outlet passages respectively are of use in equalizing pressures.

I show two forms in which my individual cylinders, valves and impellers may be combined to make effective series or series-parallel blowing units with counterbalancing of the crescent and impeller respectively in one cylinder by diametrically-oppositely located corresponding members in the other cylinder. One form appears in Figs. 4–9 and the other in Figs. 10–12. Taking up the first group: I prefer to make use of cylinders of different sizes, in this case of the same diameter but of different lengths, and to supply all of the air for the shorter cylinder from the blast or forward side of the impeller blade of the larger cylinder. Each of the two cylinders and contents is identical in principle with that which I have described in Figs. 1–3, but a single impeller and a single valve, each having diametrically opposite though similar parts, is used for the two cylinders, ordinarily without necessity for other counterbalancing, and the intermediate structure to prevent leakage and allow proper air passage is not shown in those figures.

I will briefly distinguish the slightly different structures by which the principles represented in Figs. 1–3 are applied to the two combinations of cylinders shown, taking up Figs. 4–9 first. The frame 1' is necessarily extended to provide for the diaphragm 33 as well as ends 3', 4', here shown as fitting to the shafts, a permissible form. The parts 5—14 are substantially the same. The impeller 15' has blades 16, 16', wings 17, 17' and webs 18, 18' but no counterweight 19. The inlet port 20' and outlet port 21' are shown in permissible slightly different forms. The crescent valve 22' has oppositely facing inner surfaces 23, 23' and outer surfaces 28, 28', and edges 24, 24', 25, 25' following the contours respectively of wings 26, 26' and 27, 27' until the outer surfaces 28, 28' begin to roll about 29, 29'.

The spaces 34, 34' within the webs, provide for somewhat more ready distribution of the air from the inlet port and to the exhaust port than are found in the structure illustrated in Figs. 1–3, and the arrows indicated in Figs. 4–9 give directions of movement of air and of rotation which are highly desirable in this form as well as consistent with each other, while the arrows in the other forms indicate merely an arbitrary selection among equally desirable directions of movement. If the two cylinders be made of equal size in the form shown in Figs. 4–9 this form also becomes fully reversible. The passage of air from one cylinder into the other in this form is provided by a port 35 which leads from the compressed air or "blowing" side of the cylinder within which the air first enters, here shown as cylinder 36, to the admission side of the blade in cylinder 37; that is from the space just ahead of the blade 16 to the space just behind the blade 16'. The air is admitted freely back of the blade 16 and is trapped at each revolution so as to be expelled in front of this blade at the next revolution and is forced into the smaller cylinder 37, at a correspondingly higher pressure, back of the blade 16′. This air, so driven into cylinder 37 back of its blade and at a pressure above the atmospheric pressure, is likewise trapped at each rotation and is driven out of this cylinder upon the succeeding rotation of the blade 16′. These several actions are continuous, with the result that air is constantly being admitted to cylinder 36, driven into cylinder 37 and expelled from cylinder 37. This arrangement of the two cylinders is in series since, from the same viewpoint as to each, the outlet from the blowing part of the one is into the intake of the receiving part of the other. I have not considered illustration of the storage space or supply duct necessary.

In the form shown in Figs. 10, 11 and 12, I prefer to supply air under atmospheric pressure to both cylinders, that in the second cylinder passing freely into it through the first, so that air enters freely back of both impeller blades and at the same position relatively to their complete rotations. This constitutes one series path of air flow between the two cylinders. I prefer to make the parts the same as in Figs. 4-9, except as to the relative sizes of the cylinders and the difference in the arrangement of the ports between the two cylinders. I prefer to make the cylinders 38, 39 of the same length and diameter, and to form a port 40 between them, which affords passage from the space back of the impeller blade 16 in cylinder 38 into the cylinder 39, directly back of the impeller blade 16′. The direction of the air current is pointed out in Figs. 10, 11 and 12 by arrows 41. From the front of the impeller blade 16 and as indicated by arrows 42, a port 43 permits passage of air axially through the division plate and then circumferentially so as to allow this air to enter the cylinder 39 directly in front of the impeller blade 16′, constituting a second series path of air flow between the two cylinders. The volume of air acted upon by impeller blade 16′ thus becomes approximately double that acted upon by impeller blade 16, including both the cylinder full of air at atmospheric pressure admitted through port 40 and trapped between the valve and impeller blade once in each rotation of the latter, and also the cylinder full of air correspondingly trapped per rotation in cylinder 38 and forced from that cylinder into cylinder 39 by the impeller blade 16 and ahead of impeller blade 16′. It will thus be seen that the spaces in front of and in the rear of the two impeller blades respectively in the two cylinders are connected in series so that the air reaching the rear of impeller blade 16′ passes first through the space in rear of the impeller blade 16 in cylinder 38, and that reaching the space in front of the impeller blade 16′ passes first through the space in front of impeller blade 16 within cylinder 38 and is pumped by said impeller blade 16. These two series paths of flow between the two cylinders might fairly be considered to be in parallel notwithstanding their mingling in the second cylinder and constitute what I have termed the "series-parallel" form.

It will be evident that the tendency to unbalance my impeller structure and valve in the structure shown in Fig. 4 by reason of the difference in the length of the impellers and valve structures in the different cylinders would be compensated wholly, or in part, by the difference in retardation to the impellers in the two cylinders due to the difference in pressures against which they are operating and that any required compensation for the difference may be made up by the counterweights.

Having thus described my invention, what I claim as new and desire to secure by Letters Patent is:

1. In a device of the character stated, a cylinder and an impeller therein in combination with a crescent-shaped valve; the impeller having a blade fitting the cylinder, curved wings on opposite sides of the blade, an inlet port leading into the space between the blade and one wing, an outlet port leading from the space between the blade and the other wing and a cylindrical surface concentric with the impeller axis, joining the bases of the wings around the back of the blade, and the crescent-shaped valve having a concave surface traced by the path of the outer edge of the impeller blade, edges tracing the outer surfaces of the impeller wings and a convex surface corresponding in diameter and circumferential extent to the cylindrical part of the impeller.

2. In a device of the character stated, a pair of cylinders in series, a pair of oppositely placed impeller blades in said cylinders, a pair of flared wings joined to substantially surround the impeller blade in each cylinder, the spaces between the wings in the two cylinders being joined by a port, and a valve in each cylinder rotating coincidently with its impeller blade and wings and coöperating therewith.

3. In a device of the character stated, adjoining cylinders, impeller blades in the two cylinders connected together, wings substantially inclosing the impeller blades, the space within the wings in adjoining cylinders being connected by a port, and a single valve in each cylinder connected together and coöperating with the impeller blades and wings to form a complete seal.

4. In a device of the character stated, a pair of cylinders in series, a pair of impeller blades operating in said cylinders, the two cylinders being joined by a port, flared wings partially inclosing each impeller blade and joined about the blades by cylindrical portions, a crescent shaped valve rotating synchronously with the impeller blade in each cylinder to present its concave side to the blade and flared wings partially surrounding each impeller, and rolling with the cylindrical joining portions of said wings.

5. In a device of the character stated, a pair of cylinders in series, a pair of oppositely placed impeller blades operating coincidently therein, side wings in proximity to each impeller blade and substantially inclosing the space about the same, the spaces within the wings in the two cylinders being connected by a port and a single valve in each cylinder rotating coincidently with the impeller blades and approaching the impeller blades and their wings to act as a seal to the impeller at each rotation.

THOMAS W. GREEN.

Witnesses:
MAE HOFMANN.
WILLIAM STEELL JACKSON.